United States Patent
Tondorf et al.

[11] Patent Number: 5,687,489
[45] Date of Patent: Nov. 18, 1997

[54] GUIDE ASSEMBLY

[75] Inventors: Sebastian Tondorf, Waging; Christian Callimici, Miesbach, both of Germany

[73] Assignee: Dr. Johannes Heidenhain GmbH, Traunreut, Germany

[21] Appl. No.: 546,803

[22] Filed: Oct. 23, 1995

[30] Foreign Application Priority Data

Oct. 25, 1994 [DE] Germany ............... 44 38 079.8

[51] Int. Cl.[6] .................. G01B 5/02; G01B 5/004
[52] U.S. Cl. ................................. 33/706; 33/503
[58] Field of Search .................. 33/503, 710, 706, 33/707, 708

[56] References Cited

U.S. PATENT DOCUMENTS

| | | |
|---|---|---|
| 4,250,381 | 2/1981 | Yoshiike et al. ............... 33/707 |
| 4,262,423 | 4/1981 | Affa ............................... 33/707 |
| 4,381,609 | 5/1983 | Holstein ........................ 33/708 |
| 4,492,032 | 1/1985 | Nelle ............................. 33/710 |
| 4,495,703 | 1/1985 | Sakata et al. ................. 33/503 |
| 4,509,262 | 4/1985 | Nelle ............................. 33/707 |
| 4,936,023 | 6/1990 | Pechak .......................... 33/706 |
| 4,950,079 | 8/1990 | McMurtry et al. ............ 33/503 |
| 4,951,399 | 8/1990 | Ernst ............................. 33/706 |

*Primary Examiner*—Thomas B. Will
*Attorney, Agent, or Firm*—Anderson Kill & Olick, P.C.

[57] ABSTRACT

A guide assembly to be mounted on a machine-tool or a measuring machine and including a guide rail mountable in the machine-tool or the measuring machine as an independent structural element, and a linear encoder mountable on the guide rail as a separate unit before mounting of the guide rail in the machine-tool or the measuring machine.

32 Claims, 5 Drawing Sheets

GUIDE ASSEMBLY

BACKGROUND OF THE INVENTION

The present invention relates to linear or curved guides or guide assemblies; in particular for machine tools or measuring machines, and the rectilinear or arcuate guide rails of which are mounted in the machines as a separate structural element or unit.

Such linear or curved guides are represented preferably by anti-friction guideways, which are formed as a hardened and ground rectilinear or arcuate track the matching means of which is formed by either roller or ball elements that support a slide (see publications "Industrie Anzeiger (Report)" 18/92, p.p. 43–45 and "Produktion," No. 39 of Sep. 29, 1994, p. 23).

A linear guide with an integrated linear encoder and mounted in a machine-tool or a measuring machine is disclosed in Japanese Patent Publication JP-OS-3-153915, and in JNA-Technical Product Information TPI 86 of September, 1995 in an article "Integrated Opto-Electronic Measuring Systems CMS."

In the known linear guide assemblies with an integrated linear encoder, which are used in machine-tools or measuring machines, the scale scanning head is displaced directly on the guide rail and at that is fixedly connected with the slide displaceable on the guide rail. This necessitates a special adjustment and may cause, during the mounting of the guide rail or during the operation of the machine, deformations in the encoder which adversely influence the measurement accuracy. Furthermore, in the known linear guides with an integrated linear encoder for machine-tools or measuring machines, the scale is practically rigidly connected with the guide rail, so that, in case of the required maintenance or damage, the entire linear guide should be taken off the machine, which leads to increased operational expenses.

Machine-tools or measuring machines, in which a linear encoder is mounted as a separate unit on a machine bed or a machine carriage releasably, either directly with appropriate connection elements or is mounted indirectly by using a mounting rail, are generally known. At that, the mounting rail can have its own connection elements or be fixedly mounted on a machine, with the encoder being releasably connected with the mounting rail by connection elements (see U.S. Pat. No. 3,910,703, European patent No. 3,910,703, European patent No. 0 185 072 and German Utility Model No. 88 08 811). As connection elements, dovetail-shaped elements are used which are provided on the respective structural parts.

With the use of pressure cylinders without a piston rod, it is known to secure a sealed linear encoder on a cylinder tube with retaining elements engaging in a longitudinal groove provided in the outer surface of the cylinder tube and extending parallel to the cylinder bore (see European Patent No. 0 214 615).

Accordingly an object of the invention is an improved linear or curved guide assembly, in particular for machine-tools or measuring machines, the linear encoder of which can be easily mounted on or dismounted from the machine, while insuring a high measuring accuracy.

SUMMARY OF THE INVENTION

This and other objects of the invention, which will become apparent hereinafter, are achieved by mounting the linear encoder on the guide rail of the guide assembly as a separate unit before mounting of the guide rail on a machine-tool or a measuring machine.

Preliminary mounting of the encoder as a separate unit on the guide rail not only insures separate functioning but also provides for easy assemblage and permits separate maintenance of the guide and the encoder. At that, no weakening of the guide rail takes place, and the measurement precision does not depend on the mounting mode and the loading conditions. For example, the measurement precision would not depend on the tightening torques during screwing of the screws with which the guide rail is secured, or on the manner of attachment of the guide rail. Another advantage of the guide assembly according to the present invention consists in that it is easily adaptable to different guide systems.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENT

Figure 1:
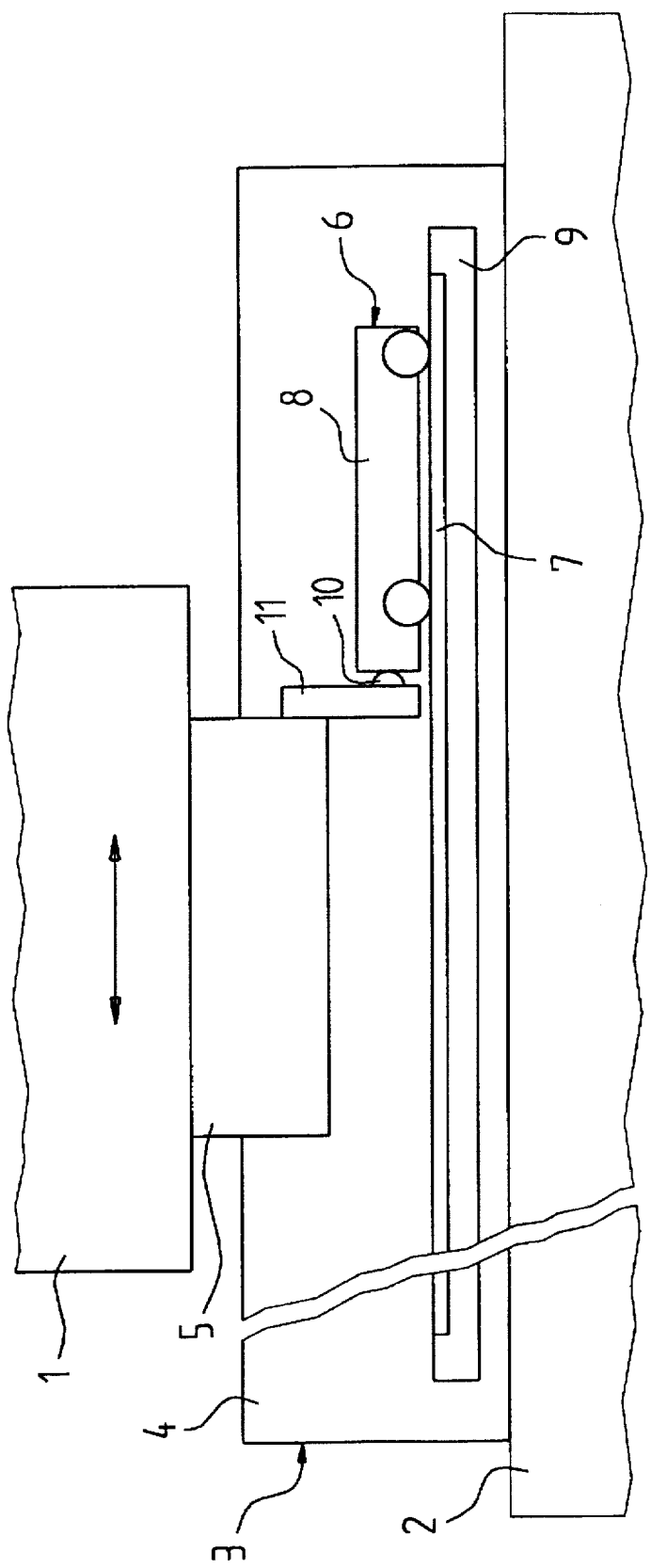
FIG. 1 shows a first embodiment of a linear guide according to the present invention on a guide rail of which an exposed linear encoder is mounted.
Figure 2:
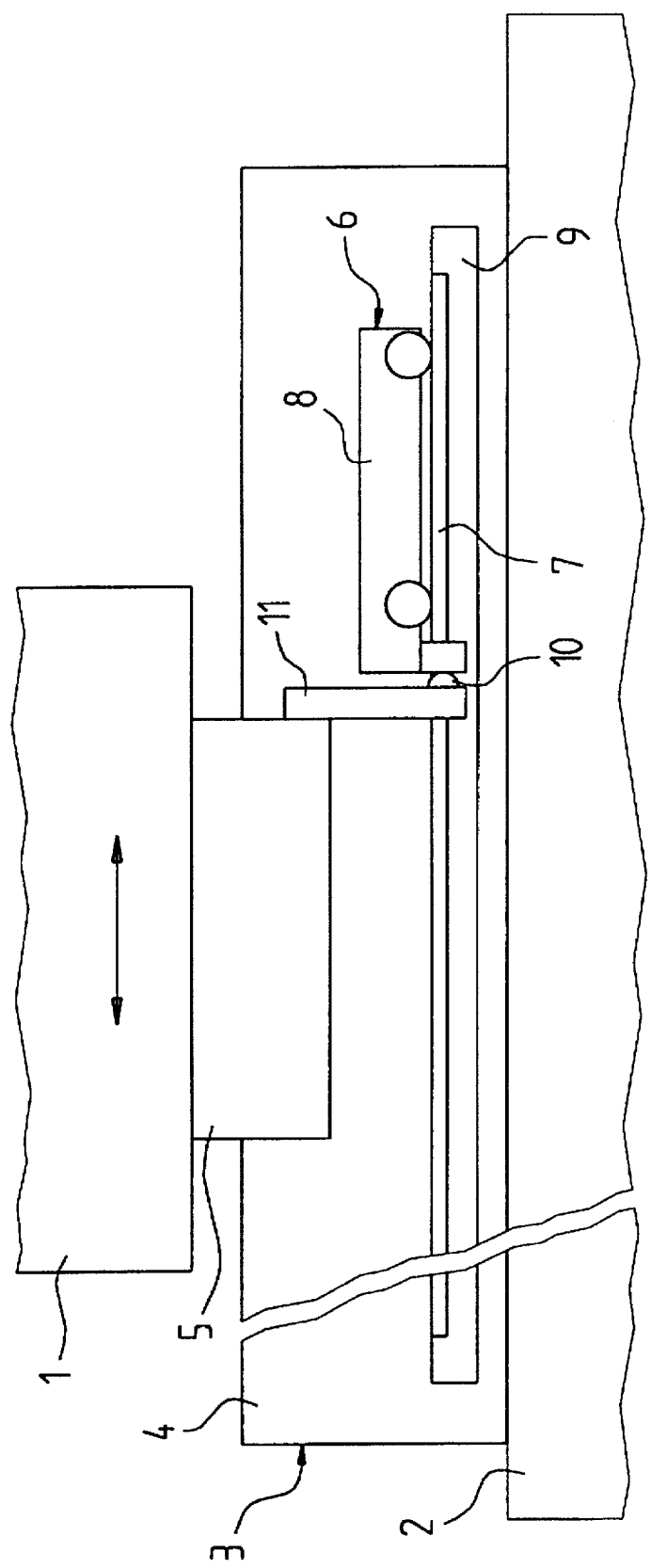
FIG. 2 shows a second embodiment of a linear guide according to the present invention on a guide rail of which an exposed linear encoder is mounted.

FIG. 1 shows a bed 2, e.g., of a machine-tool or a measuring machine on which a machine carriage 1 is displaceable in the directions shown by a double arrow. The carriage guide 3 represents a conventional linear guide provided with a guide rail 4 having hardened ground guide surfaces on which a slide 5 is displaceable on non-shown roller or ball elements. The slide 5 of the linear guide 3 is associated with the machine carriage 1 the displacement of which relative to the machine bed 2 should be measured or adjusted. As discussed above, such guides are generally known. In FIGS. 1 and 2, an exposed linear encoder 6 is a separate unit which is mounted on the guide rail 4 before mounting of the linear guide 3 on the machine. The linear encoder 6 has a scale 7, which is supported on carrier 9 and which is scanned with a scanning head 8 which generates appropriate measuring signals. The carrier 9 serves at that as an auxiliary guide for the scanning head 8 displaceable on ball bearings and connected by a coupling 10 with a driver 11 which, in turn, is secured on the slide 5 of the linear guide 3. The coupling 10 consists, in the simplest case, of elements with a curved and a flat surface which are kept in contact by a tension spring. The coupling 10 insures that the scanning head 8 is rigidly coupled to the slide 5 only during the displacement in a measuring direction. In the other directions, the scanning head 8 is pivotable. In FIG. 1, the scanning head 8 is attached to its carrier at the height of the graduation plane of the scale 7, and in FIG. 2—at the height of the neutral axis of the scale 7. Such mounting of the scanning head is shown, e.g., in German Patent No. 2,219, 624.

Figure 8:
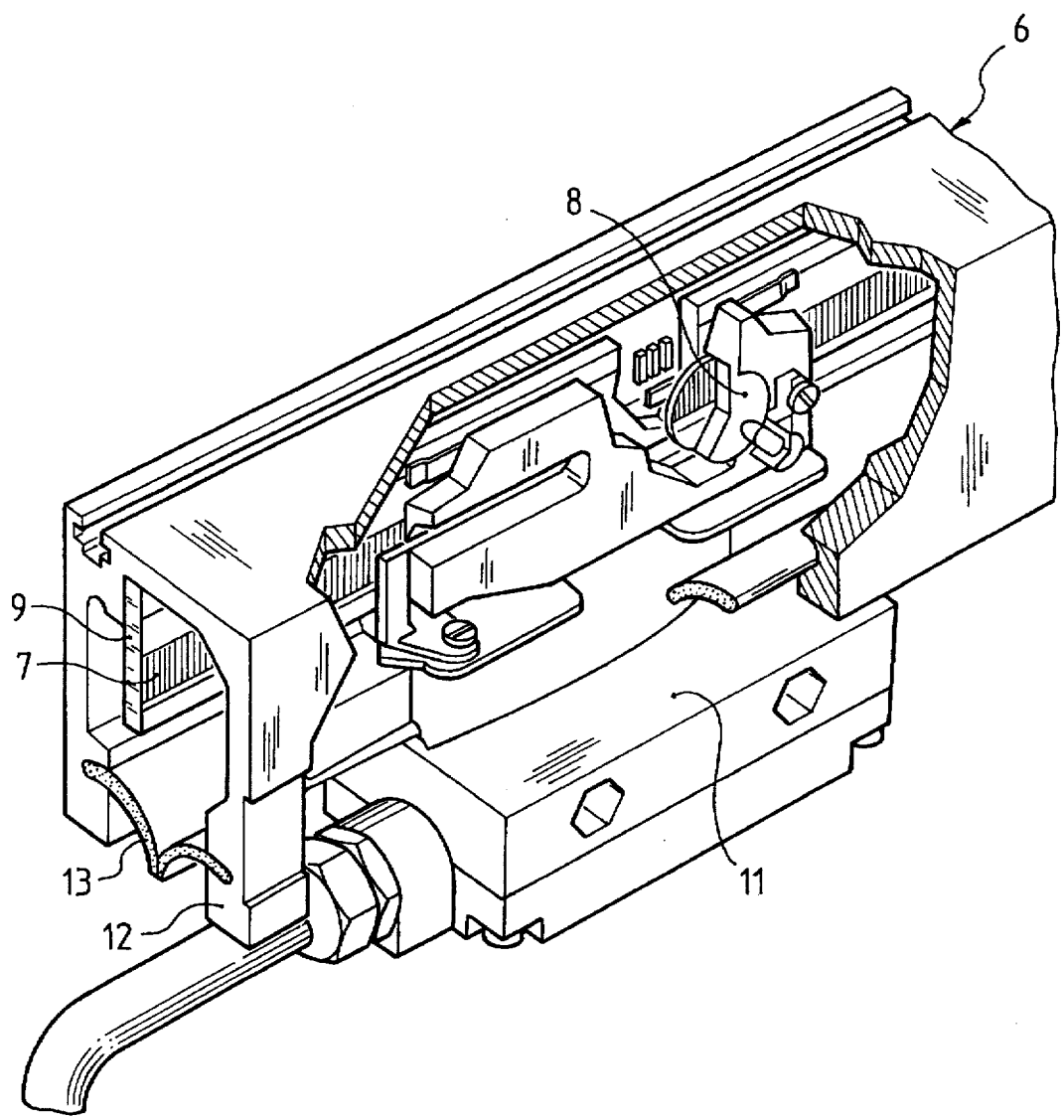
FIG. 8 shows a sealed incremental linear encoder operable on photoelectrical measuring principle.

The linear encoder in the discussed embodiment represents an incremental measuring device operable according to photo-electrical principle, as shown in FIG. 8. However, the linear encoder 6 mounted on the guide 3 can also be an absolute measuring device operable on a different physical principle, e.g., magnetic, inductive or capacitance principle.

Figure 3:
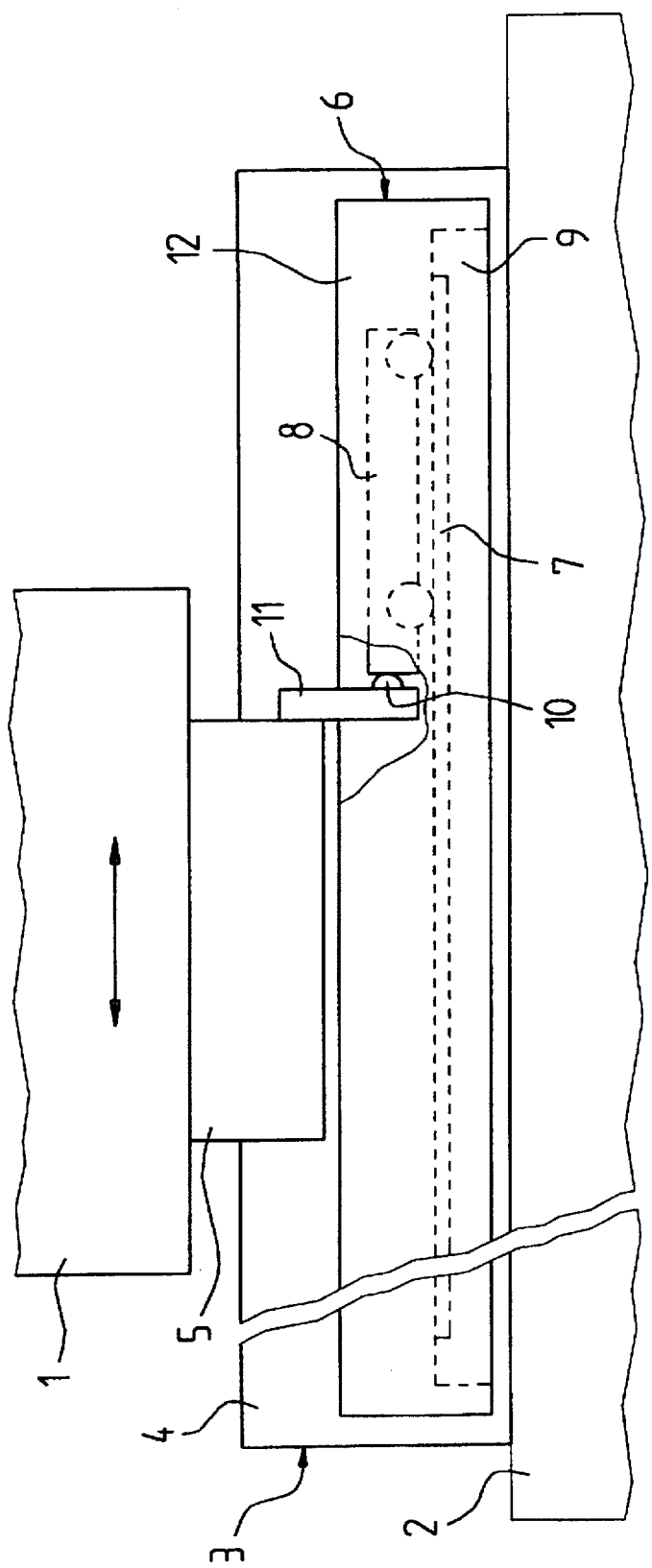
FIG. 3 shows a linear guide according to the present invention on a guide rail of which a sealed linear encoder is mounted.
Figure 4:
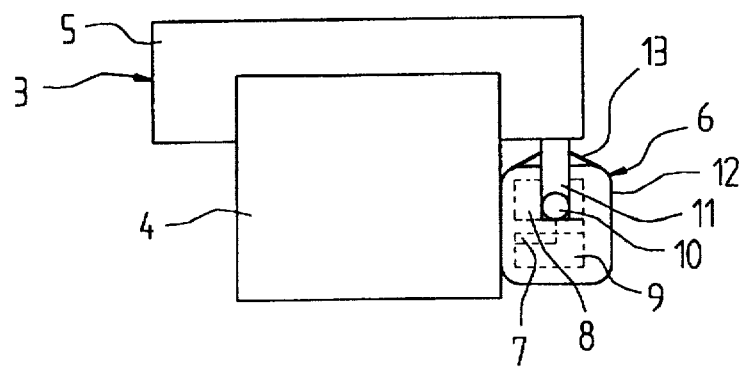
FIG. 4 shows an end view of the linear guide shown in FIG. 3.

FIGS. 3 and 4 show a sealed incremental linear encoder 6 which is mounted on the guide rail 4 as a separate unit before mounting of the guide rail in a machine. The encoder 6, as discussed above, is shown in FIG. 8. The encoder 6 includes a scale (7) having grating ruling which is scanned by the scanning head 8 having corresponding ruling for generating electrical measuring signals. The scale 7 is arranged on a carrier 9 which serves as an auxiliary guide for the scanning head 8, displaceable thereon, and is pivotally connected with a driver 11. The scale 7 and the scanning head 8 are received in a housing 12 sealed by rubber or plastic lip element 13. The driver 11 is fixedly connected with the slide 5 of the guide 3 and extends through the lip element 13. The sealed linear encoder 6 can operate in accordance with different physical principle than that described above with reference to FIGS. 1 and 2.

The exposed and sealed linear encoders 6, which, according to the invention, form a separate unit which is provided on the linear guide 3 before mounting the linear guide on a machine, are described in a firm publication "Heidenhain-Lieferubersicht, August 1994, pp. 10–17.

Figure 5:
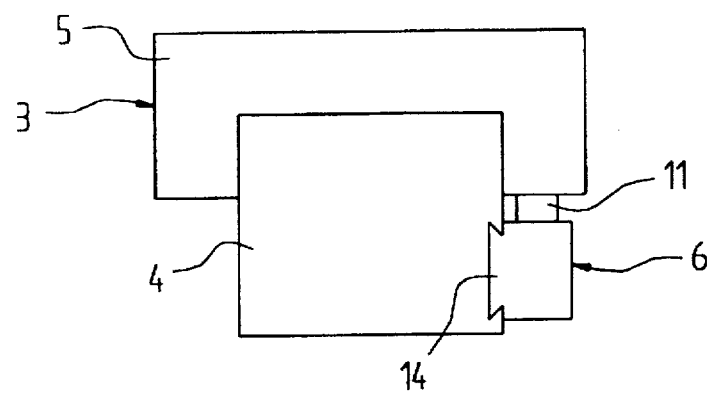
FIG. 5 shows a linear guide according to the present invention, together with a linear encoder, which is provided with a change-over coupling.

FIG. 5 shows a sealed linear encoder 6 which can be easily mounted on the guide rail 4 by means of a change-over coupling 14 and is easily replaceable. The change-over coupling 14 is formed as a dovetail matching pair. The dovetail groove is formed in the guide rail 4, and the dovetail-formed member is provided on the linear encoder 6.

Figure 6:
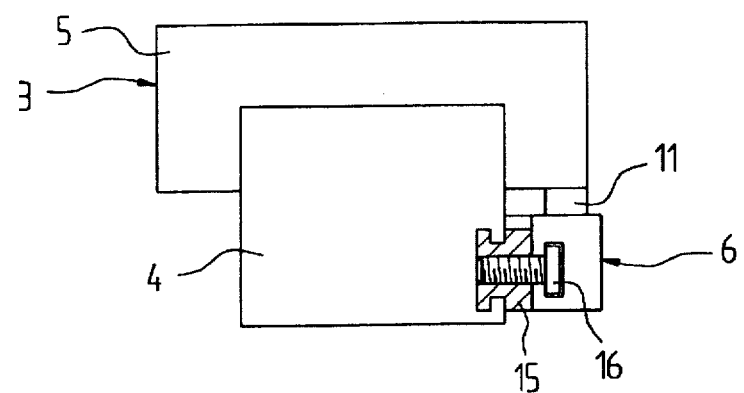
FIG. 6 shows a linear guide according to the present invention, together with a linear encoder, which is supported on a mounting rail.

FIG. 6 shows a linear guide 3 with which the sealed linear encoder 6 is mounted on the guide rail 4, according to the invention, by means of a mounting rail 15 provided on the guide rail 4. The mounting rail 15 is formed as a punch-in slotter and is secured to the guide rail 4 with a screw 16. It is also contemplated providing a change-over coupling between a mounting rail, which is secured on the guide rail, and the linear encoder.

Figure 7:
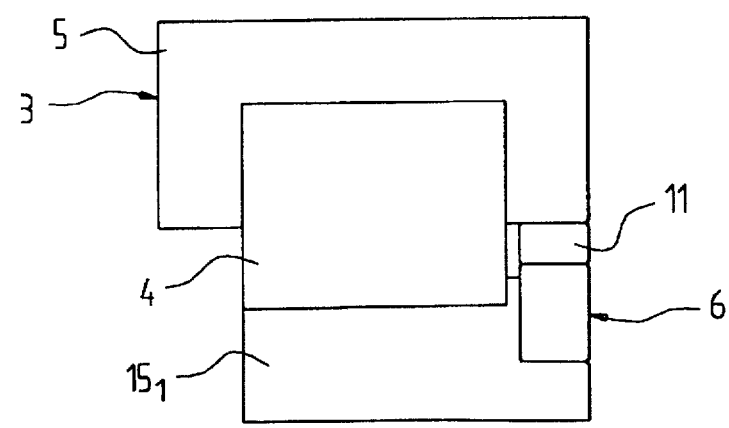
FIG. 7 shows another embodiment of a linear guide according to the present invention, together with a linear encoder, which is mounted on a mounting rail.

FIG. 7 shows a linear guide 3 which is supported on a mounting rail 15₁, and on which the linear encoder 6 is replaceably mounted, with the encoder 6 being connected with the slide 5 by a driver 11.

The scale and/or its carrier can be connected with the guide or mounting rail, in a manner not shown in the drawings, practically free of reaction or constraining forces by articulated compensation elements provided at the scale ends. The compensation elements at that can be formed as a change-over coupling.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A guide assembly for a machine-tool or a measuring machine, comprising:

guide means mounted on a machine-tool or measuring machine bed as an independent structural element and comprising a guide rail and an encoder, said encoder being mounted on the guide rail as a separate unit, said encoder having a scale, a scanning head for measuring a displacement path of a slide, and a housing for sealing the scale and the scanning head, the housing being connected to the guide rail; and the slide being displaceable on the guide rail and connected with a machine-tool carriage or a measuring machine carriage.

2. A guide assembly as set forth in claim 1, further comprising a coupling for coupling the scanning head of the encoder to the slide, which coupling insures that the scanning head is rigidly coupled to the slide during displacement of the slide in a measuring direction and is pivotally coupled thereto during the displacement of the slide in another direction.

3. A guide assembly as set forth in claim 1, wherein the guide rail comprises one of a rectilinear rail and an arcuate rail.

4. A guide assembly as set forth in claim 1, further comprising a separate auxiliary guide, which is connected with the guide rail, for supporting the scanning head of the encoder.

5. A guide assembly as set forth in claim 1, further compromising a separate mounting rail for connecting the encoder with the guide rail.

6. A guide assembly as set forth in claim 4, wherein the auxiliary guide is formed by at least one of the scale itself and a separate element.

7. A guide assembly as set forth in claim 4, wherein the auxiliary guide is formed as the housing for sealing the scale and the scanning head and secured on the guide rail.

8. A guide assembly as set forth in claim 1, further comprising articulated compensation elements for connecting one of the scale and a scale carrier, formed as a sealed housing, to the guide rail so that the one of the scale and the scale carrier is practically not subjected to any reaction forces.

9. A guide assembly as set forth in claim 1, wherein a graduation of the scale is located outside of the neutral axis of the scale, and wherein the scanning head is displaceable parallel to a graduation plane and is located at a level of the neutral axis of the scale.

10. A guide assembly as set forth in claim 4, wherein the scanning head, which is displaceable on the auxiliary guide, is located in a plane of a graduation of the scale.

11. A guide assembly as set forth in claim 1, further comprising at least one clamping member for rigidly securing the encoder on the guide rail.

12. A guide assembly as set forth in claim 11, wherein the clamping member acts on the guide rail and one of the encoder and a carrier of the encoder.

13. A guide assembly as set forth in claim 1, further comprising a dovetail pair for connecting the housing to the guide rail and consisting of a dovetail-shaped groove provided in the guide rail and a dovetail-shaped projection member provided on the housing.

14. A guide assembly as set forth in claim 1, further comprising a mounting rail for supporting the housing on the guide rail, the mounting rail having a projection engageable in a groove provided in the guide rail.

15. A guide assembly for a machine-tool or a measuring machine, comprising:

guide means mounted on a machine-tool or measuring machine bed as an independent structural element and comprising a guide rail, an encoder, said encoder being mounted on the guide rail as a separate unit, said encoder having a scale and a scanning head and measuring a displacement path of a slide, and means for positively and replaceably connecting the encoder with the guide rail; and the slide being displaceable on the guide rail and connected with a machine-tool carriage or a measuring machine carriage.

16. A guide assembly as set forth in claim 15, further comprising a coupling for coupling the scanning head of the encoder to the slide, which coupling insures that the scanning head is rigidly coupled to the slide during displacement of the slide in a measuring direction and is pivotally coupled thereto during the displacement of the slide in another direction.

17. A guide assembly as set forth in claim 15, wherein the guide rail comprises one of a rectilinear rail or an arcuate rail.

18. A guide assembly as set forth in claim 15, further comprising a separate auxiliary guide, which is connected with the guide rail, for supporting the scanning head of the encoder.

19. A guide assembly as set forth in claim 18, wherein the auxiliary guide is formed by at least one of the scale itself and a separate element.

20. A guide assembly as set forth in claim 15, wherein the connecting means comprises a change-over coupling provided on the guide rail.

21. A guide assembly as set forth in claim 15, further compromising a separate mounting rail for connecting the encoder with the guide rail.

22. A guide assembly as set forth in claim 15, further comprising a mounting rail secured to the guide rail, the connecting means comprising a change-over coupling having means provided directly on the guide rail and a side of the mounting rail which is adjacent to the guide rail.

23. A guide assembly as set forth in claim 15, further comprising a mounting rail for supporting the encoder and secured to the guide rail, said connecting means comprising a change-over coupling for mounting the encoder on the mounting rail.

24. A guide assembly as set forth in claim 15, wherein the connecting means comprises form-lockingly engaging elements secured respectively to the encoder and the guide rail.

25. A guide assembly as set forth in claim 24, wherein the form-lockingly engaging elements are elements of a dovetail pair.

26. A guide assembly as set forth in claim 25, wherein the dovetail pair comprises a dovetail groove, which is formed in the guide rail, and a dovetail member provided on one of the encoder and a carrier thereof.

27. A guide assembly as set forth in claim 15, further comprising a housing in which the scale and the scanning head are sealed, the connecting means releasably securing the housing on the guide rail at a guide rail side.

28. A guide assembly as set forth in claim 27, wherein the housing has a slot and lip means for sealing the slot, the encoder including a driver extending through the sealing lip means and connected, on one hand, with the scanning head and, on the other hand, with the slide, the guide assembly further comprising a coupling which rigidly connects the drive with the scanning head during displacement of the slide in a measuring direction and pivotally connects the driver with the scanning head during displacement of the slide in an other direction.

29. A guide assembly as set forth in claim 18, wherein the auxiliary guide is formed as a housing for sealing the scale and the scanning head and secured on the guide rail.

30. A guide assembly as set forth in claim 15, further comprising articulated compensation elements for connecting one of the scale and a scale carrier, formed as a sealed housing, to the guide rail so that the one of the scale and the scale carrier is practically not subjected to any reaction forces.

31. A guide assembly as set forth in claim 15, wherein a graduation of the scale is located outside of the neutral axis of the scale, and wherein the scanning head is displaceable parallel to a graduation plane and is located at a level of the neutral axis of the scale.

32. A guide assembly as set forth in claim 18, wherein the scanning head, which is displaceable on the auxiliary guide, is located in a plane of a graduation of the scale.

* * * * *